Nov. 11, 1947.    J. A. CARR ET AL    2,430,451
METHOD OF INSTALLING AERIAL LINE WIRES
Filed June 17, 1944    2 Sheets-Sheet 2
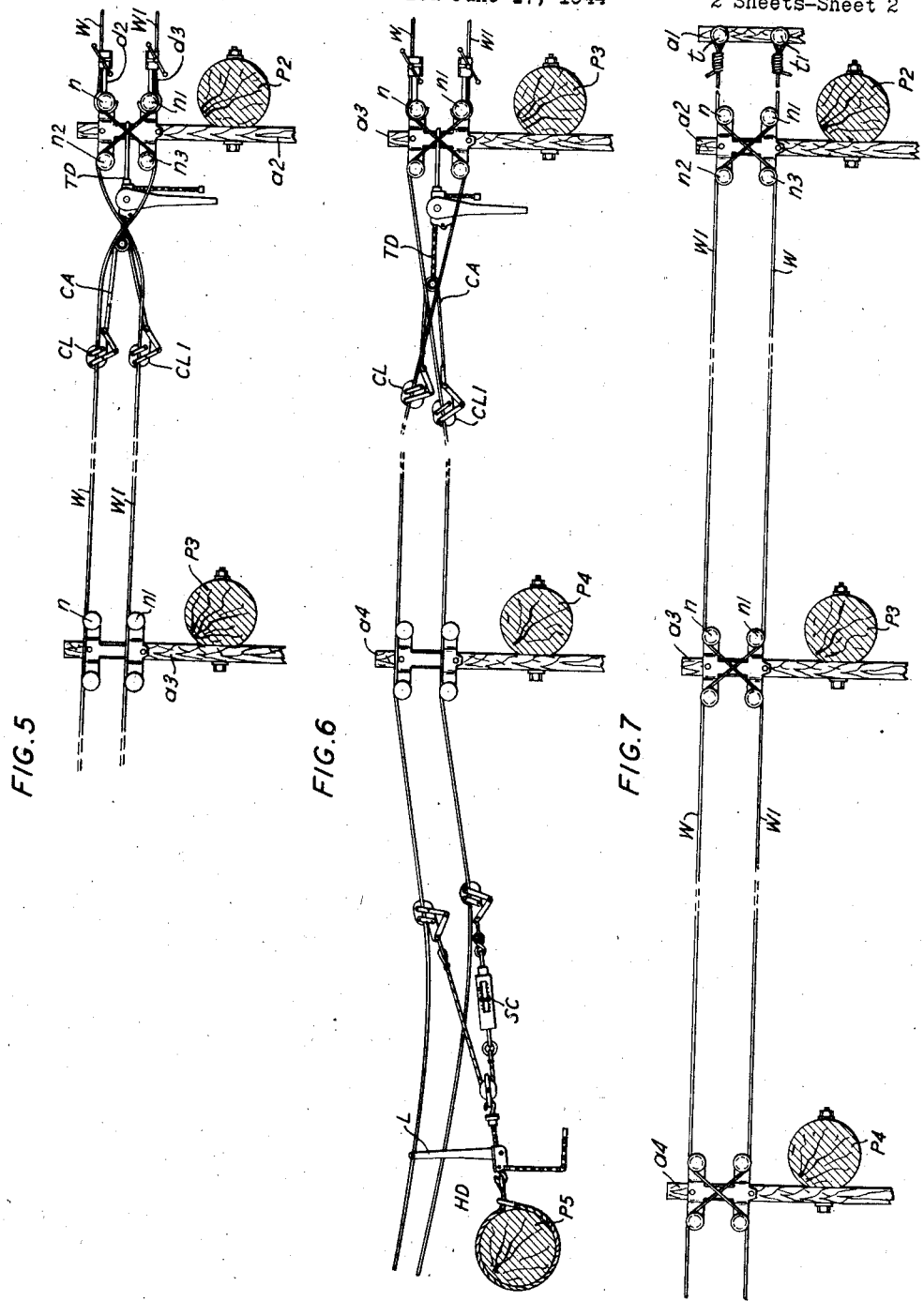
INVENTORS  J. A. CARR
           A. L. FOX
BY
*Walter C. Kiesel*
ATTORNEY Patented Nov. 11, 1947

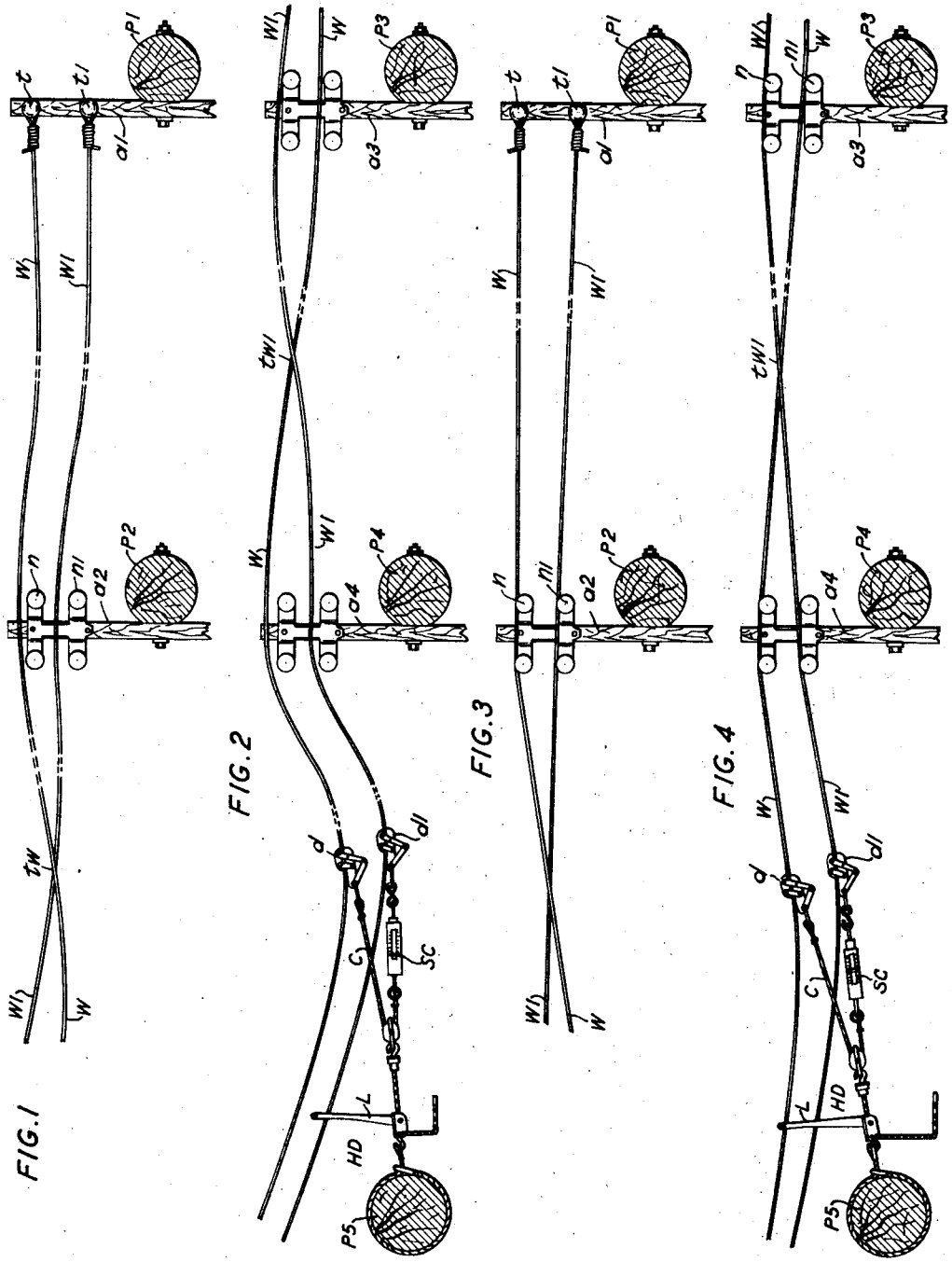

2,430,451

UNITED STATES PATENT OFFICE 2,430,451

METHOD OF INSTALLING AERIAL LINE WIRES

James A. Carr, Maplewood, and Arthur L. Fox, Upper Montclair, N. J., assignors to Bell Telephone Laboratories, Incorporated, New York, N. Y., a corporation of New York Application June 17, 1944, Serial No. 540,858

2 Claims. (Cl. 175—376)

This invention relates to a method of transposing and tensioning line wires on cross-arms mounted on poles which support the line wires.

The usefulness of open-wire toll lines has been considerably augmented in recent years by applying carrier systems to them. Inductive interference has to be kept within minimum limits requiring the line wires to be transposed at every pole and the sag differences between the wires of a pair must be held to close limits in any span.

Previously used methods for installing line wires in a manner to satisfy the new requirements have been found to be difficult and to consume much time. For example, it was customary to pull the wires over the cross-arms at the top of the poles in lengths of approximately one-third of a mile, snub them at one end and apply tension at the other end through tackle. Starting at the end away from the tackle the sag of the wires between each new transposition and the one just previously established was adjusted by trial and error as the transpositions were successively set up on the insulators. A lineman at the transposition point measured the sag by sighting back on a target held by another lineman on the next pole. The tension was then raised or lowered by the man at the tackle as directed and the sag checked again and this operation, except for rare exceptions, had to be repeated several times for the same span of wire.

The object of this invention is the provision of an improved method by which the transposing and tensioning of aerial line wires on their supporting cross-arms will be facilitated, will reduce the time required for the installing of such line wires.

Referring to the drawings:

Figs. 1 and 2 show the line wires in position on their supporting cross-arms, the left end of the wires in Fig. 1 being considered joined to the right end of the line wires in Fig. 2;

Figs. 3 and 4 are views of the line wires shown in Figs. 1 and 2 but with one of the ends of the line wires attached to insulators at the first pole and the whole length of the line under tension as effected by a tensioning device attached to the other end of the wires;

Fig. 5 is a partial view showing the line wires transposed at the second pole from their attached ends at the first pole;

Fig. 6 is another partial view showing the line wires transposed at the third pole; and Fig. 7 is a view showing the position of the line wires in a completed installation.

According to the installing method of this invention the line wires W and W1 which extend from Pole P1 in Figure 1 to poles P3, P4 and P5 shown in Figs. 1 and 2, are first placed, without any appreciable amount of tension, on the cross-arms $a1$, $a2$ $a3$ and $a4$ with one of their ends attached to the insulators $t$ and $t1$ carried by the cross-arm $a1$ at pole P1 while the other ends of said line wires, extend beyond P5. Secured to said wires midway between poles P4 and P5, by means of clamps $d$ and $d1$ and an equalizing cable C having a scale SC connected thereto for indicating the tension in the wires, is a hand-operated tensioning device HD as will be hereinafter described in detail. The manual operation of the device HD, which may be of the chain hoist type, as by the reciprocating movement of handle lever L is effective to pull on the wires to adjust them collectively to the desired tension which is indicated by the reading of the scale SC, the tensioning device HD being attached to a pole P5 shown in Figs. 2, 4 and 6 near the level of the ground.

A lineman at pole P2, Fig. 5, who is generally known as the transposer secures the line wires W and W1 to clamping devices $d2$ and $d3$ which are hooked to insulators $n$ and $n1$ mounted on the stepped brackets so as to maintain the section of the line wires between pole P1 and P2 tensioned while effecting the transposition of these wires on insulators $n$, $n1$, $n2$ and $n3$ as will be hereinafter described in detail. The lineman in addition attaches the line wires W and W1 adjacent the pole P2 between this pole and pole P3 to the clamps CL and CL1 of an equalizing cable CA forming a part of a tensioning device TD hooked to the pole P2. The device HD, of course, also is effective to produce slack in the line wires. The transposer at pole P2 then telephones to the lineman at the tensioning device HD to decrease the tension of, that is, produce slack in, wires W and W1 an amount necessary to effect the transposition of the line wires at pole P2 as shown in Fig. 5. The slack thus introduced in the line wires is taken up at a point between the clamps CL and CL1 and clamps $d2$ and $d3$ by the transposer upon the operation of the tensioning device TD thus facilitating the transposition of the wires on their insualtors $n$, $n1$, $n2$, $n3$ after which the clamps $d2$ and $d3$ are detached from the line wires and this followed by the loosening of the clamps CL and CL1 of the equalizing cable CA and the removal of the tensioning device TD when the scale SC again indicates the original tension of the wires W and W1.

The transposer now proceeds to the successive pole P3 to effect the transposition of the line wires W and W1 as shown in Fig. 6 in a manner similar to that described in connection with the transposition of the line wires at pole P2 and repeating this operation at each successive pole to the completion of the installation of the line wire shown in Fig. 7 but with the ends of wires W and W1 anchored or attached to suitable supports which may be the pole P5 shown in Figs. 2, 4 and 6.

By the use of the method of this invention for the laying, tensioning and transposing of line wires considerable time is saved and more uniform sag is obtained for the reason that the wires are sagged over a comparatively long length of line, for example, three-quarters to one mile in one operation instead of repeating the sagging performance on a trial and error basis between each transposition point occurring at each pole, and the extra lineman formerly required at the pole adjacent the one where the transposition is being made in order to assist in reading the sag gage, and adjusting the sag is no longer needed, while the sagging of the entire length of the line wires in one operation following each transposition, results in more uniform sag relations than when the line wires are sagged on a trial and error basis between each transposition.

What is claimed is:

1. The method of installing, sagging and transposing a pair of telephone wires on a line of poles to secure the proper sag in each wire of the pair throughout many spans at one operation and retaining this sag without further adjustments in the subsequent transposing operations, which comprises positioning the pair of wires on the cross-arms of the poles with the transpositions rolled in, dead ending the wires on the cross-arms of the first pole, applying an initial tension to the wires by a chain hoist secured to the opposite ends of the wires, snubbing the wires to the insulators on the transposition bracket at the second pole to hold the tension constant in the direction of the completed construction, slacking off the necessary additional length of wire, to enable the transposition to be made, by operating the chain hoist to release the required number of links, pulling this additional wire introduced into the spans by a slack puller equipped with an equalizer at the second pole, transposing the wires at the second pole insulators, and removing the snubbing clamps and slack puller.

2. An improved method of installing, sagging and transposing a pair of line wires pulled in over the cross-arms of a line of telephone poles with the wires transposed, which comprises positioning the wires at the levels they will occupy, dead ending the wires on the cross-arm of the first pole P1, applying an initial tension to the wires by means of a suitable tensioning device secured to the opposite ends of the wires, snubbing the said wires at the succeeding pole P2, attaching suitable equalizing clamping means to the wires in the span just beyond said succeeding pole P2, securing to the cross-arm of said succeeding pole and to said clamping means a device for applying back tension to said wires to put slack therein when said first-mentioned tensioning device is released a redetermined amount, to permit said pair of wires to be placed in their final transposed positions.

JAMES A. CARR.
ARTHUR L. FOX.

REFERENCES CITED

The following references are of record in the file of this patent:

UNITED STATES PATENTS

| Number | Name | Date |
| --- | --- | --- |
| 1,265,861 | Williams | May 14, 1918 |
| 2,301,266 | Fox | Nov. 10, 1942 |
| 1,501,590 | Floyd | July 15, 1924 |
| 1,798,777 | Anderson | Mar. 31, 1931 |
| 1,563,377 | Klein | Dec. 1, 1925 |
| 1,860,052 | Peterson | May 24, 1932 |
| 2,174,427 | Taylor | Sept. 26, 1939 |